Patented Apr. 3, 1945

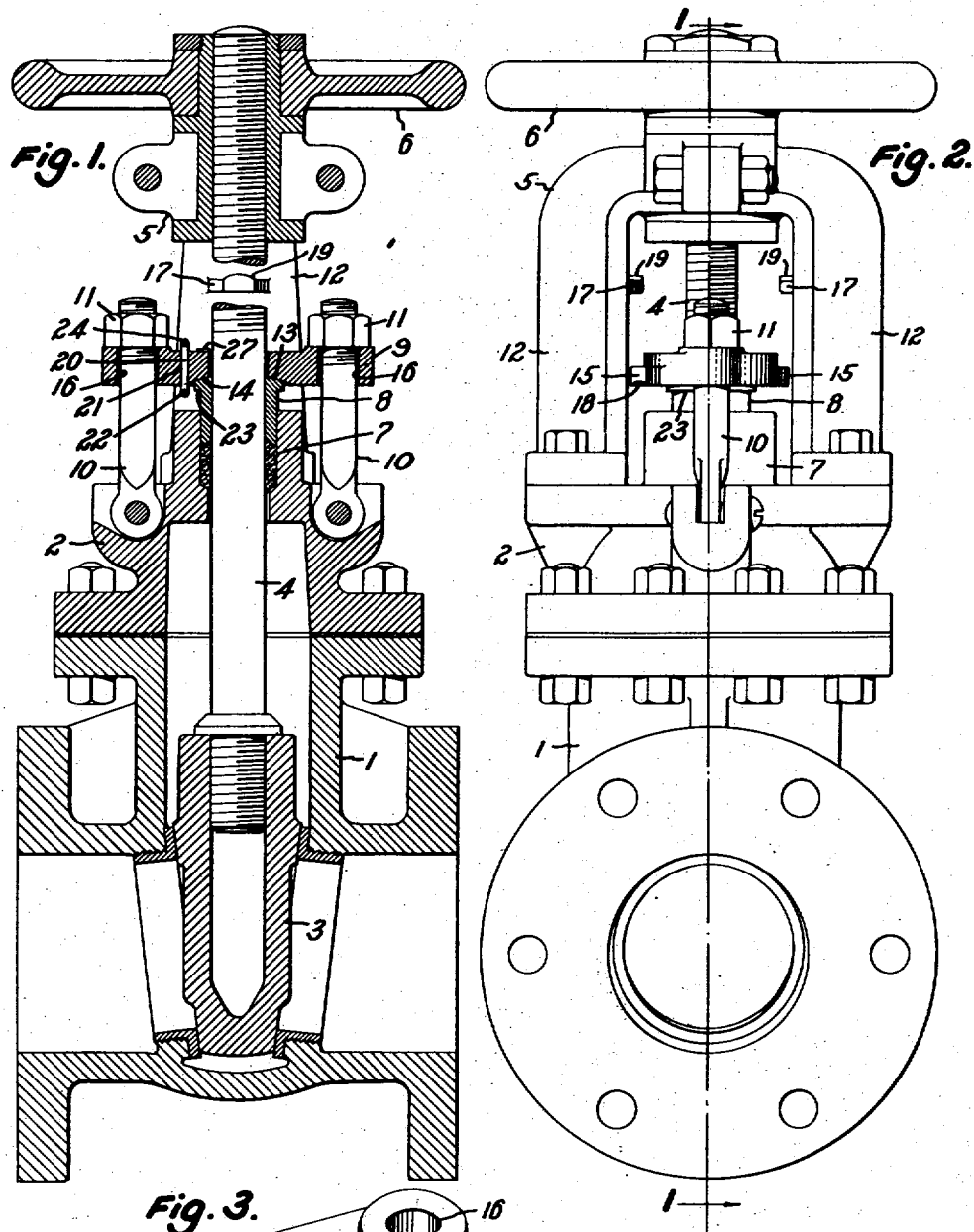

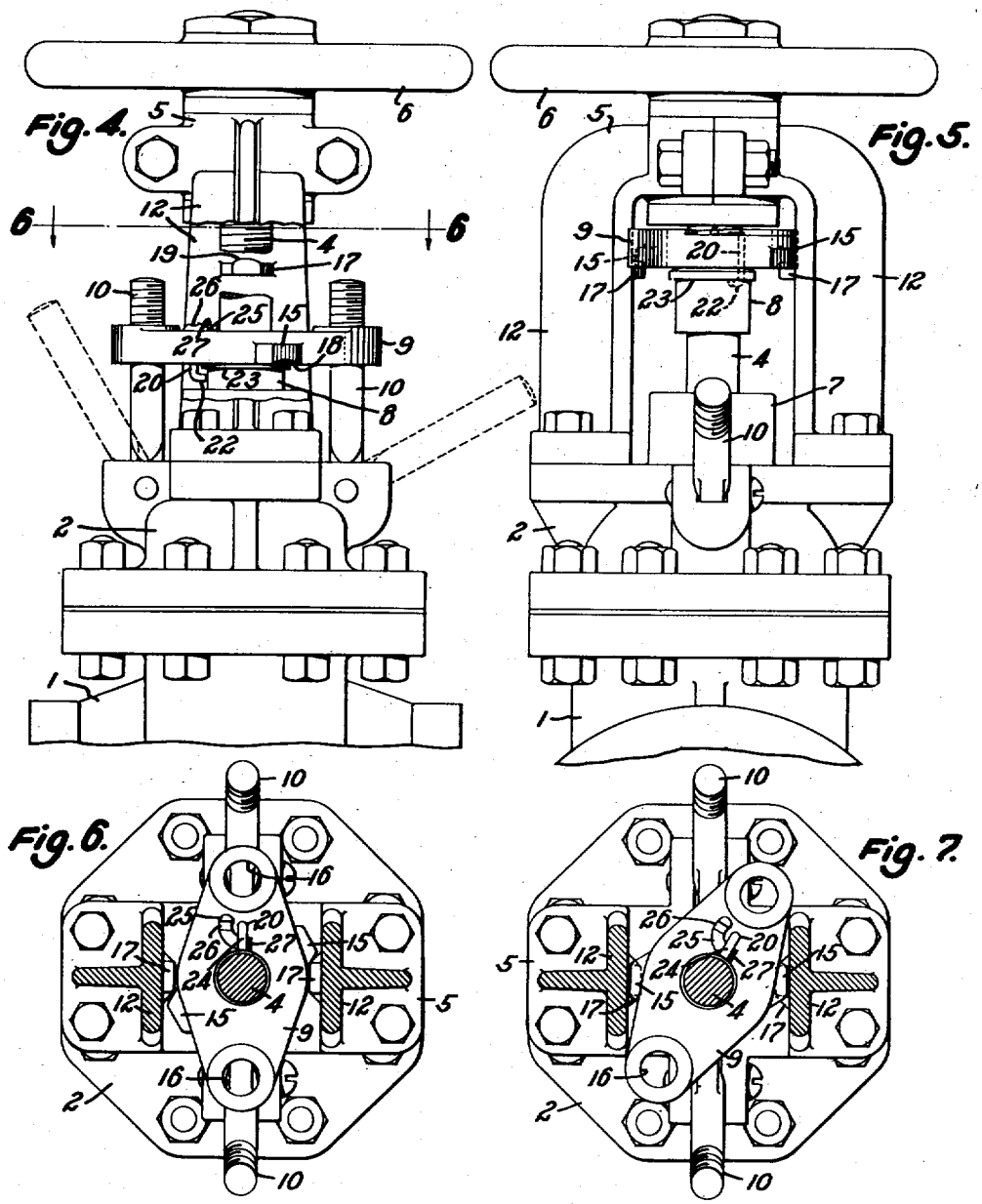

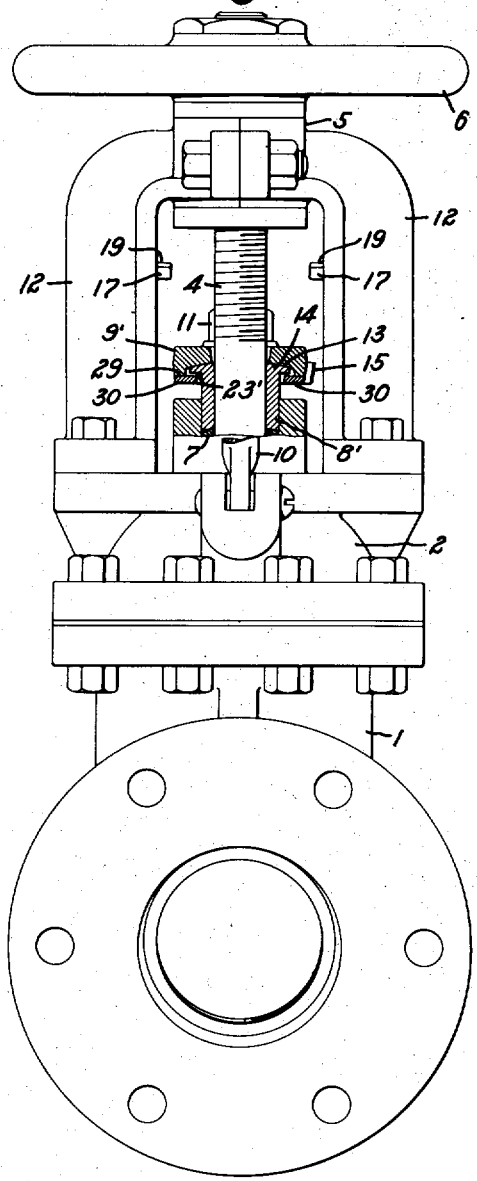
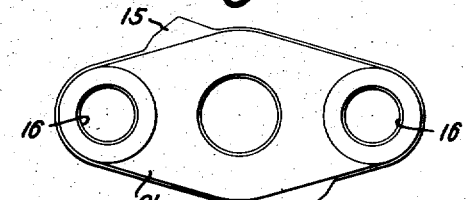
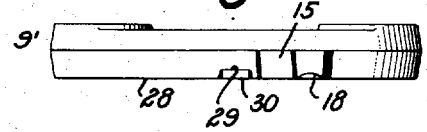
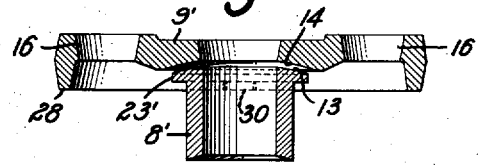
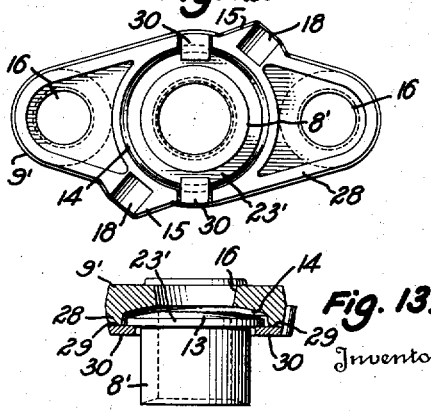

2,373,020

UNITED STATES PATENT OFFICE 2,373,020

VALVE

Howard G. Doster, Wadsworth, Ohio, assignor to
The Ohio Injector Company, Wadsworth, Ohio,
a corporation of Ohio Application January 26, 1944, Serial No. 519,802

10 Claims. (Cl. 251—59)

This application is a continuation-in-part of my application of the same title filed July 20, 1943, Serial No. 495,476.

The invention relates to valves, especially to a valve of the type wherein the body or bonnet is provided with a yoke supported bearing for the outer end of the valve stem and a packing gland for such valve stem arranged between the arms of the yoke and adapted for repacking, without dismounting of the valve parts, by provision of a removable follower member, and it is particularly directed to means for supporting the follower member when removed from the gland for repacking, especially when such follower member has a separable follower flange member, so that the follower member and flange member will not interfere with or obstruct the work or replacing or renewing the packing in the gland.

In packing glands of the type referred to, wherein a separable flange member is provided for pressure-bolting the follower member to the valve body or bonnet, while at the same time accommodating unequal application of pressure, it is customary for the follower member and flange member to have complemental mating surfaces of spherical form and there is no connection between the follower member and flange member whereby the follower member will be supported by the flange member when the latter is moved outwardly upon the valve stem and the follower member withdrawn from the gland. These parts have heretofore been handled separately and ordinarily interfere to some extent with the replacing or renewing of the packing in the gland.

The object of the invention is to provide means for retaining the gland follower flange member in supported released position for repacking of the gland and for coupling the gland follower member to the follower flange member in such a manner that these two parts may be handled individually or as a unit, as desired, so that the repacking operation may be materially simplified, all as will be explained hereinafter more fully and finally claimed.

In the accompanying drawings illustrating the invention, in the several figures of which like parts are similarly designated, Fig. 1 is a sectional view of a valve of the type referred to provided with a gland follower member and a gland follower flange member embodying the invention, the section being taken in the plane of line 1—1, Fig. 2.

Fig. 2 is an elevational view of the valve of Fig. 1.

Fig. 3 is an enlarged perspective view of the gland follower flange member of the invention, in one preferred form.

Fig. 4 is a fragmentary side elevational view of the valve of Fig. 1 with parts broken away to show the gland follower member and flange member freed of the usual clamping nuts and in condition for withdrawal from the gland.

Fig. 5 is a fragmentary view similar to Fig. 2 but showing the gland follower member and flange member withdrawn from the gland and supported as a unit sufficiently remote from the gland to facilitate repacking thereof.

Fig. 6 is a transverse sectional view taken on the line 6—6 of Fig. 4, but with the gland follower member and flange member withdrawn from the clamping bolts.

Fig. 7 is a view similar to Fig. 6 but with the gland follower flange member and the gland follower member adjusted, as a unit, for support clear of the gland.

Fig. 8 is a view similar to Fig. 2, but with parts broken away and in section, showing a modification of the gland follower flange member.

Figs. 9 and 10 are, respectively, a top plan view and a side elevational view of the modified form of follower flange member shown in Fig. 8.

Fig. 11 is a longitudinal sectional view showing the follower member and modified flange member in assembled, relatively movable, relation.

Fig. 12 is a bottom plan view of the modified follower flange member and follower member, assembled, and Fig. 13 is a transverse sectional elevational view of the parts as shown in Figs. 11 and 12.

The parts of the valve, including the body 1, bonnet 2, gate 3, stem 4, yoke 5, hand wheel 6, gland 7, gland follower 8, gland follower flange member 9, and clamping bolts 10 with their nuts 11, are, in the main, of conventional form, but the arms 12, 12 of the yoke, and the gland follower member 8 are gland follower flange 9 are modified in the matter of various structural details to adapt them to the practice of the invention.

As shown, the gland follower member 8 and follower flange member 9 are provided with conventional mating spherical surfaces 13 and 14, respectively, thus making pressure-bolting of the follower possible without binding regardless of uneven pressure applied by the bolts 10 and nuts 11. However, despite the advantages inherent in this and other forms of separate, cooperating gland follower members and follower flange members, they have the disadvantage that when they are withdrawn for repacking of the gland they will separate, and, although the follower flange member may be supported out of the way of packing operations, the follower member itself will tend to slide back into the gland and is thus an inconvenience.

In accordance with the invention, the follower flange member is provided with diametrically arranged ears 15 offset or displaced at an angle with respect to the longitudinal axis through the bolt holes 16, and the arms 12 of the yoke 5 are provided with inwardly offstanding lugs 17, it being noted that the under surfaces 18 of the ears 15 and the upper surfaces 19 of the lugs 17 are of a form serving for complemental interengagement, preferably of arcuate form. Thus when the follower flange member is withdrawn from the gland along the valve stem 4 to a position above the lugs 17, as shown in Fig. 6, and rotated through an angle equal to that of the displacement of the ears 15, substantially as shown in Fig. 7, and released so that its ears 15 will come to rest upon the lugs 17, these complemental surfaces 18 and 19 will interact to hold the follower flange member firmly supported and effectively blocked against rotation upon the valve stem 4.

In order that the gland follower member 8 may be withdrawn from the gland 7 along with the follower flange member, as is usually desired, and supported relatively remote from the gland, the follower flange member and follower member are provided with means whereby they may be connected together while still retaining a limited relatively axial, rotative and oscillatory relation.

As shown in Figs. 1 to 7, the means of connection may be in the form of a partially rotatable U-shaped hook member 20 pivotally retained in a bore 21 in the follower flange member, one leg 22 thereof extending below the flange member and capable of engagement with or disengagement from an offstanding annular lip 23 on the gland follower member 8, and the other leg 24 overlying the flange member and normally riding upon a cam track 25 having adjacent to one end a seat 26 and adjacent to its other end a stop member 27.

The leg 24 of the hook member 20 will, normally, when the gland parts are in operative assembly, be retained in the seat 26 of the cam track (see Figs. 1 and 3), and the leg 22 thus held from engagement with the annular lip 23 of the gland follower. However, when it is desired to connect the gland follower with the follower flange member, so that the two may be handled as a unitary assembly, it is merely necessary to rotate the leg 24 through approximately 90° thus positioning the leg 22 below the lip 23, the leg 24 thus assuming a relatively fixed position between the end of the cam track 25 and the stop member 27 (see Figs. 4 and 6).

With this mode of connection, it will be seen that the follower member 8 and follower flange member 9 are capable of being handled as separate parts, or they may be interconnected and handled as a unit.

In the modification illustrated in Figs. 8 to 13, it is intended that the follower member 8' and follower flange member 9' be handled, primarily, as a unit, while still providing such a connection between them that they will be afforded the desired relative axial, rotative and oscillatory movement. However, when these parts are removed from the stem 4 they may be separated by a relative rocking and sliding movement longitudinally of the follower flange member 9' by virtue of the spherical contour of the mating surfaces 13 and 14.

To this end the follower flange member 9' is recessed at its lower face to provide a rim 28 normally extending below the offstanding lip 23' of the follower member, and preferably in notches 29 provided in diametrically opposite portions of the lip 28 are arranged finger means 30, secured by welding, as shown, or otherwise appropriately fastened to the flange. These fingers extend from the flange 28 radially inwardly so as to underlie the lip 23' of the follower member to an extent sufficient to prevent inadvertent complete axial separation of the follower member and follower flange member, but sufficient separation is provided to accommodate the parts to the relative axial, rotative and oscillatory movement necessary for their effective functioning.

The form, arrangement and purpose of mating spherical surfaces 13 and 14, and the ears 15 with their specially contoured surfaces 18 are substantially the same as described in connection with Figs. 1 to 7.

The operation of the structural improvements of the invention will, it is believed, be understood from the foregoing, but in the interest of clearness, and as is apparent from an inspection of Figs. 4 to 7, it will be seen that when the pressure-bolting nuts 11 are removed, the gland follower member 8 or 8' may be withdrawn with the follower flange member 9 or 9' from the gland 7, and when the flange member is elevated above the lugs 17 of the yoke arms 12 and partially rotated, as shown in Figs. 5 and 7, and already described, it may be relatively immovably supported by engagement of the specially contoured under surfaces of its ears 15 with the complemental upper surfaces of the lugs 17, the gland follower being suspended from the flange member either by the hook member 20, of Figs. 1 to 7, or by the fingers 30, of Figs. 8 to 13.

Various changes and modifications are considered to be within the principle of the invention and the scope of the following claims.

What I claim is:

1. A stem packing gland for valves and the like, comprising, as separable cooperative relatively movable parts, a gland follower member and a gland follower flange member, and means carried by one of said members for connecting it with the other member in a manner affording relative rotative oscillatory and axial movement.

2. A stem packing gland for valves and the like, including as separable cooperative relatively movable parts, a gland follower member and a gland follower flange member, and means carried by one of said members for separably connecting it with the other member, whereby the follower member and flank member may be handled as a unit or separately.

3. A stem packing gland for valves and the like, including as separable cooperative relatively movable parts, a gland follower member and a gland follower flange member, means carried by a relatively fixed part of the valve for supporting said flange member in a position withdrawn from said gland, and means carried by one of said members for separably connecting it with the other member, whereby the follower may be suspended from the flange member.

4. A stem packing gland for valves and the like, including, as separable relatively movable parts, a gland follower member and a gland follower flange member, complemental means for separably connecting said follower with said flange member, said connecting means including offstanding lip means on said follower member and hook means on said flange member, said hook means being adjustable for engagement with or disengagement from said lip means, whereby the follower and flange member may be handled as a unit or separately.

5. A stem packing gland for valves and the like, including, as separable relatively movable cooperative parts, a gland follower member and a gland follower flange member, complemental means for separably connecting said follower with said flange member, said connecting means including offstanding lip means on said follower member and hook means on said flange member, said hook means being adjustable for engagement with or disengagement from said lip means, whereby the follower member and flange member may be handled as a unit or separately, and means on said flange member cooperating with said hook means to retain the same in its positions of engagement with and disengagement from said lip means.

6. In a valve, having a stem and yoke means or the like flanking said stem, a packing gland for said stem comprising, as separable relatively movable cooperative parts, a gland follower member and a gland follower flange member, means for supporting said flange member in a position withdrawn from said gland, including cooperating elements on said flange member and yoke means respectively, and means for connecting said follower member and flange member in condition for relative movement, the follower member being thus supported by the flange member when the latter is supported by said cooperating elements in a position withdrawn from said gland.

7. In a valve, having a stem and yoke means or the like flanking said stem, a packing gland for said stem including a follower provided with follower flange means, and means for supporting said follower by the follower flange means in a position withdrawn from said gland, including complemental elements carried by said yoke means and flange means, respectively, the flange means being longitudinally and rotatably movable with respect to said stem and flanking yoke means to thereby permit engagement of the complemental supporting elements of the flange means and yoke means, the complemental supporting elements of the flange means and yoke means having respective surfaces of mating concave and convex contour, whereby their inadvertent disengagement is restrained.

8. A stem packing gland for valves and the like, including, as individual cooperative parts, a gland follower member and a gland follower flange member, the same being provided with complemental spherical surfaces, and means carried by one of said members and engaging the other and affording a separable connection between said members providing for their relative axial rotative and oscillatory movement.

9. A stem packing gland for valves and the like, including, as cooperative relatively movable parts, a gland follower member and a gland follower flange member, and means affording a separable connection between said members providing for their relative axial rotative and oscillatory movement, comprising offstanding lip means on said follower member and finger means on said flange member underlying said lip means.

10. A stem packing gland for valves and the like, including, as separable cooperative relatively movable parts, a gland follower member provided with offstanding lip means and a gland follower flange member recessed to receive said lip means and having finger means engageable therewith, and said members provided with mating bearing surfaces, the lip means and finger means affording a lost motion connection between said members providing for their relative axial rotative and oscillatory movement.

HOWARD G. DOSTER.

---

CERTIFICATE OF CORRECTION.

Patent No. 2,373,020. April 3, 1945.

HOWARD G. DOSTER.

It is hereby certified that error appears in the printed specification of the above numbered patent requiring correction as follows: Page 1, first column, line 17, for "work or" read --work of--; and second column, line 43, for "are gland" read --and gland--; page 2, second column, line 61, claim 2, for "flank" read --flange--; and that the said Letters Patent should be read with this correction therein that the same may conform to the record of the case in the Patent Office.

Signed and sealed this 12th day of June, A. D. 1945.

Leslie Frazer (Seal) Acting Commissioner of Patents.

lower flange member, complemental means for separably connecting said follower with said flange member, said connecting means including offstanding lip means on said follower member and hook means on said flange member, said hook means being adjustable for engagement with or disengagement from said lip means, whereby the follower and flange member may be handled as a unit or separately.

5. A stem packing gland for valves and the like, including, as separable relatively movable cooperative parts, a gland follower member and a gland follower flange member, complemental means for separably connecting said follower with said flange member, said connecting means including offstanding lip means on said follower member and hook means on said flange member, said hook means being adjustable for engagement with or disengagement from said lip means, whereby the follower member and flange member may be handled as a unit or separately, and means on said flange member cooperating with said hook means to retain the same in its positions of engagement with and disengagement from said lip means.

6. In a valve, having a stem and yoke means or the like flanking said stem, a packing gland for said stem comprising, as separable relatively movable cooperative parts, a gland follower member and a gland follower flange member, means for supporting said flange member in a position withdrawn from said gland, including cooperating elements on said flange member and yoke means respectively, and means for connecting said follower member and flange member in condition for relative movement, the follower member being thus supported by the flange member when the latter is supported by said cooperating elements in a position withdrawn from said gland.

7. In a valve, having a stem and yoke means or the like flanking said stem, a packing gland for said stem including a follower provided with follower flange means, and means for supporting said follower by the follower flange means in a position withdrawn from said gland, including complemental elements carried by said yoke means and flange means, respectively, the flange means being longitudinally and rotatably movable with respect to said stem and flanking yoke means to thereby permit engagement of the complemental supporting elements of the flange means and yoke means, the complemental supporting elements of the flange means and yoke means having respective surfaces of mating concave and convex contour, whereby their inadvertent disengagement is restrained.

8. A stem packing gland for valves and the like, including, as individual cooperative parts, a gland follower member and a gland follower flange member, the same being provided with complemental spherical surfaces, and means carried by one of said members and engaging the other and affording a separable connection between said members providing for their relative axial rotative and oscillatory movement.

9. A stem packing gland for valves and the like, including, as cooperative relatively movable parts, a gland follower member and a gland follower flange member, and means affording a separable connection between said members providing for their relative axial rotative and oscillatory movement, comprising offstanding lip means on said follower member and finger means on said flange member underlying said lip means.

10. A stem packing gland for valves and the like, including, as separable cooperative relatively movable parts, a gland follower member provided with offstanding lip means and a gland follower flange member recessed to receive said lip means and having finger means engageable therewith, and said members provided with mating bearing surfaces, the lip means and finger means affording a lost motion connection between said members providing for their relative axial rotative and oscillatory movement.

HOWARD G. DOSTER.

---

CERTIFICATE OF CORRECTION.

Patent No. 2,373,020.                          April 3, 1945.

HOWARD G. DOSTER.

It is hereby certified that error appears in the printed specification of the above numbered patent requiring correction as follows: Page 1, first column, line 17, for "work or" read --work of--; and second column, line 43, for "are gland" read --and gland--; page 2, second column, line 61, claim 2, for "flank" read --flange--; and that the said Letters Patent should be read with this correction therein that the same may conform to the record of the case in the Patent Office.

Signed and sealed this 12th day of June, A. D. 1945.

Leslie Frazer (Seal)                                          Acting Commissioner of Patents.